Figure 1:
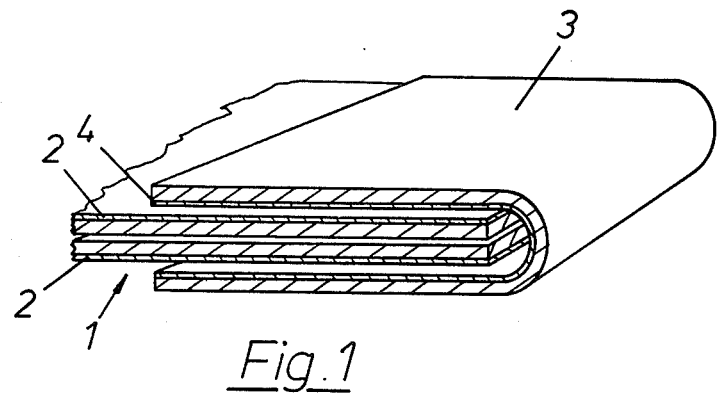

United States Patent [19]

Bibby

[11] 4,190,010
[45] Feb. 26, 1980

[54] WATERPROOF INWARDLY FACING GARMENT SEAMS PRODUCED BY HIGH FREQUENCY WELDING

[75] Inventor: Noel Bibby, East Bridgford, England

[73] Assignee: Noel Bibby Limited, Nottingham, England

[21] Appl. No.: 885,232

[22] Filed: Mar. 10, 1978

[30] Foreign Application Priority Data

Mar. 18, 1977 [GB] United Kingdom ............ 11506/77

[51] Int. Cl.$^2$ .................. A41D 27/24; B29C 27/04; B32B 3/06; B32B 7/08; C09J 5/10
[52] U.S. Cl. ...................................... 112/419; 2/275; 156/73.5; 428/104; 428/121; 428/122; 428/192; 428/193
[58] Field of Search ............... 156/73.5; 428/104, 121, 428/122, 192, 193; 112/419; 2/275

[56] References Cited

U.S. PATENT DOCUMENTS

| 2,153,352 | 4/1939 | Steinberger | 428/104 |
|---|---|---|---|
| 2,372,632 | 3/1945 | Webb | 428/104 |
| 2,403,756 | 7/1946 | Read | 428/104 |
| 2,406,830 | 9/1946 | Haman et al. | 428/104 |
| 2,465,374 | 3/1949 | Haman et al. | 428/104 |
| 2,941,577 | 6/1960 | Roseman | 2/275 |
| 2,994,631 | 8/1961 | Ottinger | 428/104 |
| 3,026,225 | 3/1962 | Ostby | 2/275 |
| 3,996,082 | 12/1976 | Leatherman | 156/73.5 |
| 4,010,300 | 3/1977 | Wallin | 428/104 |

FOREIGN PATENT DOCUMENTS

979829 1/1965 United Kingdom ............ 2/275

Primary Examiner—J. C. Cannon
Attorney, Agent, or Firm—Sprung, Felfe, Horn, Lynch & Kramer

[57] ABSTRACT

A method is disclosed of forming a seam joining together two edges of a piece of fabric coated on one face with a water-impervious high frequency weldable plastics material, so as to form a water-impervious seam. In the method, the two edges are located together with the said coated faces facing outwardly, a binding strip is located over the said coated faces, the face of the binding strip in contact with the coated faces itself being coated with a high frequency activated material, and a radiofrequency field is applied to the seam to weld together adjacent said coated faces of the binding strip and the fabric. Certain forms of polyurethane and poly(-vinyl chloride) are given as examples of high frequency activated materials. A novel seam is also disclosed.

18 Claims, 2 Drawing Figures

WATERPROOF INWARDLY FACING GARMENT SEAMS PRODUCED BY HIGH FREQUENCY WELDING

This invention is for improvements in or relating to fabric seams.

In certain applications, for example in rainproof clothing, it is desirable to join together two or more edges of a piece of fabric in such a manner as to provide a seam that is waterproof. It is known to provide on the one or both faces of the fabric a high frequency activated polyurethane or poly(vinyl chloride) (P.V.C.) coating which renders the fabric impervious to water. The high frequency activated polyurethane or P.V.C. may be welded to similar polyurethane or P.V.C. coated fabrics by the application of a radiofrequency field. The field causes internal molecular activity of the coating which softens the polyurethane or P.V.C. enabling it to weld with the polyurethane or P.V.C. coating of another coated fabric. The polyurethane or P.V.C. coatings flow together to form a water impervious seal.

It is known for example to secure together two pieces of fabric which are coated with a high frequency activated material such that it is on the outside of the fabric, but this has certain disadvantages, for example the glossy appearance of the fabric, and its susceptibility to abrasion, which can destroy the waterproof properties of the fabric.

The present invention provides a method of forming a seam joining together two edges of a fabric, each edge having a face coated with a high frequency activated material, which comprises locating together the said two edges with the said coated faces facing outwardly, locating a binding strip over the said coated faces, the face of the binding strip in contact with the coated faces itself being coated with a high frequency activated material and applying a radiofrequency field to the seam to weld together adjacent said coated faces of the binding strip and the fabric.

The edges to be joined may be edges of the same piece of fabric, or they may be edges of two pieces of fabric. They may be sewn together before the binding strip is located over them, and the binding strip may be sewn over them in a separate operation, or the whole seam may be sewn in a single operation. Sewing of the seam should not take place after the welding operation, as sewing perforates the seam and renders it pervious to water.

The invention also provides a seam joining together two edges of fabric, in which each edge has a face coated with a high frequency activated material and a binding strip has one face coated with a high frequency activated material, the seam being formed by said two edges of fabric being located with the said coated faces in contact with the coated face of the binding strip, and in which the adjacent coated faces are welded together by the application of a radiofrequency field.

The present invention is particularly applicable to the formation of garments which are to be waterproof, for example 'anoraks,' 'smocks' and trousers, such as are used by campers, hikers, yachting enthusiasts, and industrial and other outdoor personnel. With the method of the present invention seams may be formed on the inside of the garment and the coating will also be on the inside of the garment, leaving the better appearance of the uncoated fabric on the outside of the garment.

The fabric may be a textile fabric, for example woven from nylon yarn. The term "high frequency activated material" as used herein means a material which will soften and can be welded on the application thereto of a radio-frequency field, the most commonly used examples being certain types of polyurethane or poly(vinyl chloride). A typical radiofrequency used is 27 MHz.

The invention includes an article made of fabric and having a seam according to the invention or made by the method of the invention.

Figure 2:
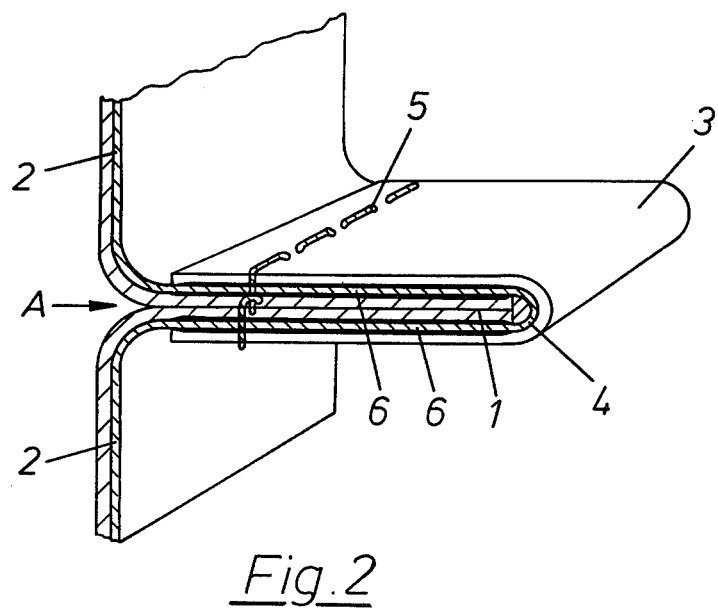

Reference is made to the accompanying diagrammatic drawing, in which:

FIG. 1 shows on an enlarged scale two edges of fabric and a binding strip arranged together to be joined according to one embodiment of the invention; and FIG. 2 shows the completed seam formed at the edges shown in FIG. 1.

Two edges 1 of one or more pieces of nylon fabric have a coating 2 of poly(vinyl chloride) on one face. A binding strip 3 of nylon fabric is also coated on one face 4 with poly(vinyl chloride). The edges 1 are placed together with their uncoated faces in contact. The binding strip 3 is placed over the edges 1 with its coated face 4 in contact with the coated faces 2 of the edges 1, and the edges and binding strip are sewn together in conventional manner. At this point, the fabric pieces are adequately secured together, but water may penetrate the seam, particularly through the stitch holes.

The seam is then subjected to the application of a radiofrequency field by a conventional high frequency welding machine such as may be used, for example, for the welding of plastics materials. The field causes molecular activity of the coatings 2 and 4, softening them so that they fuse together, and may be accompanied by the application of pressure to ensure that a good weld is formed between the coatings.

FIG. 2 shows the completed seam, which, in use, will be directed to the inside of a garment. The stitching 5 is formed by any suitable means, such as a conventional sewing machine. The coatings on the edges have fused with the coating on the binding strip so that over a part of the width of the seam a single poly(vinyl chloride) layer 6 is formed from the two coating layers 2 and 4. Thus, if water should seep along the fabric in the direction shown by arrow A, it cannot penetrate the garment.

What we claim is:

1. A garment comprising a seam joining together two edges of a fabric, in which each edge has a face coated with a high frequency activated material and a binding strip has one face coated with a high frequency activated material, the seam being formed by said two edges of fabric being located with the said coated faces in contact with the coated face of the binding strip, and in which the adjacent coated faces are welded together by the application of a radiofrequency field, said seam facing inwardly of said garment.

2. A garment according to claim 1, in which the said two edges are sewn together, the sewing being covered by the binding strip.

3. A garment according to claim 1, in which the binding strip is sewn on to the said two edges before welding of the said coated faces.

4. A garment according to claim 1 wherein said fabric is a textile fabric.

5. A garment according to claim 1 wherein said high frequency activated material is a polyurethane or polyvinyl chloride.

6. A garment according to claim 1, in which the said two edges are edges of the same piece of fabric.

7. A garment according to claim 6 in which the said two edges are sewn together, the sewing being covered by the binding strip.

8. A garment according to claim 1, in which the said two edges are edges of two pieces of fabric.

9. A garment according to claim 8 in which the said two edges are sewn together, the sewing being covered by the binding strip.

10. A method of forming a seam on the inside of a garment which seam joins together two edges of a fabric of said garment, each edge of said fabric having a face coated with a high frequency activated material, which comprises locating together the said two edges with the said coated faces facing outwardly, locating a binding strip over the said coated faces, the face of the binding strip in contact with the coated faces itself being coated with a high frequency activated material, and applying a radiofrequency field to the seam to weld together adjacent said coated faces of the binding strip and fabric.

11. A method according to claim 10, in which the said two edges are sewn together before location thereover of the binding strip.

12. A method according to claim 10, in which the binding strip is sewn on to the said two edges before welding of the said coated faces.

13. A method according to claim 10 wherein said fabric is a textile fabric.

14. A method according to claim 10 wherein said high frequency activated material is a polyurethane or polyvinyl chloride.

15. A method according to claim 10, in which the said two edges are edges of the same piece of fabric.

16. A method according to claim 15 in which the said two edges are sewn together before location thereover of the binding strip.

17. A method according to claim 10, in which the said two edges are edges of two pieces of fabric.

18. A method according to claim 17 in which the said two edges are sewn together before location thereover of the binding strip.

* * * * *